April 25, 1933.    S. T. WILLIAMS    1,905,777
AIR CHUCK
Filed Jan. 28, 1931
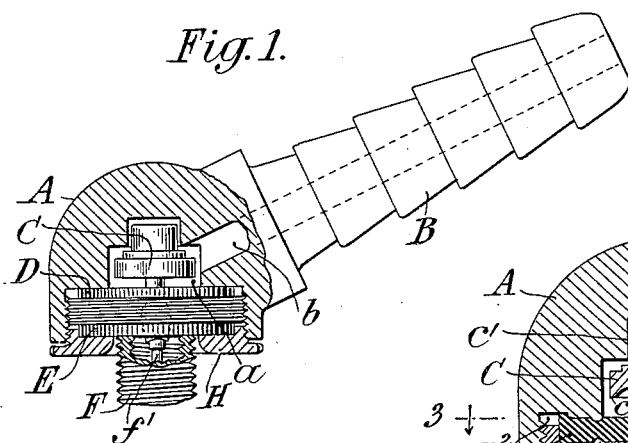
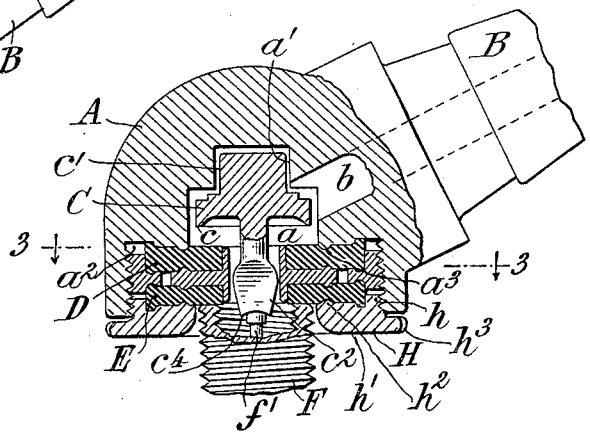
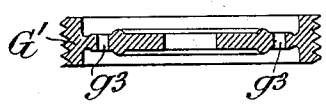
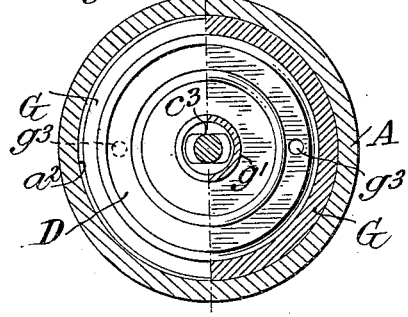
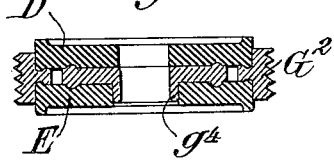
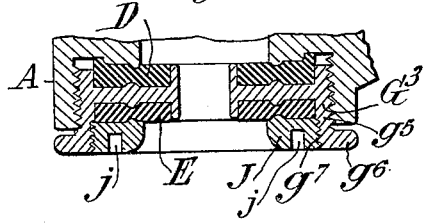
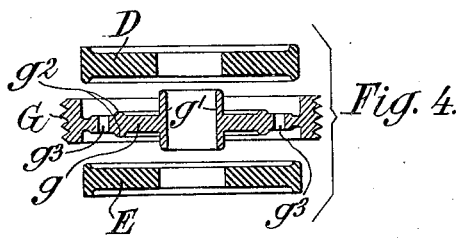
Inventor
Selden T. Williams,
By his Attorneys,
Fraser, Myers & Manley.

Patented Apr. 25, 1933

1,905,777

UNITED STATES PATENT OFFICE

SELDEN T. WILLIAMS, OF BELLEROSE, NEW YORK, ASSIGNOR TO A. SCHRADER'S SON, INCORPORATED, OF BROOKLYN, NEW YORK, A CORPORATION OF NEW YORK

AIR CHUCK

Application filed January 28, 1931. Serial No. 511,664.

The present invention relates to air chucks or inflating couplings and aims to provide certain improvements therein. Such devices are usually provided with a packing gasket which is adapted to make a tight seal when pressed against the end of a tire valve stem and with a valve seating against the inner face of said gasket and normally held thereagainst by the air pressure from a tank or reservoir to which the device is connected. The valve is usually formed with a deflator pin which is adapted to engage the top of the tire valve pin for unseating both the tire valve and the chuck valve.

When devices of the character described as heretofore made are subjected to hard and continuous use, for example, in the testing department of a tire factory, the packing gasket soon becomes worn and defective and requires replacement at frequent intervals. Aside from the replacement cost of the gaskets which this involves, it necessitates shutting off of the air supply to said device, it requires time to make the change, and renders one of the testing units temporarily idle. To prolong the life of the gasket of such devices it has been proposed to reinforce the opening therethrough with a non-deformable bushing or the like, and while said improvement prolongs the useful life of the gaskets, it nevertheless does not overcome the main item of expense incident to replacement, namely, the workman's time required to make the change.

According to the present invention I provide an air chuck or inflating coupling wherein not alone is the useful life of the gasket prolonged, but the construction is such that the replacement of a gasket can be made without shutting off the air supply and without wasting any of the compressed air in making the change. This I accomplish by employing in the device two gaskets, one functioning as a seat for the valve within the chuck, and the other for making a tight seal with the tire valve stem, the two gaskets being so positioned and held within the chuck as to permit the complete removal and replacement of the second mentioned gasket without disturbing the first mentioned one.

The invention also embodies other features of novelty which will be appreciated from the detailed description which follows.

Certain preferred embodiments of my invention are shown in the accompanying drawing, wherein Figure 1 is a side elevation partly in section, showing an air chuck embodying my invention.

Fig. 2 is a similar view on an enlarged scale, showing the chuck elements in section.

Fig. 3 is a section taken substantially along the plane of the line 3—3 of Fig. 2.

Fig. 4 is a composite, diametrical sectional view of the gaskets and a spacing-retaining element of the air chuck shown in Fig. 2.

Fig. 5 is a diametrical section of a modified form of spacing and retaining element.

Fig. 6 is a view similar to Fig. 5, of a further modification.

Fig. 7 is a fractional diametrical section of an air chuck, showing still another modification.

Referring first to Figs. 1 to 4, the air chuck consists of a substantially semi-spherical casing or housing A having a ribbed nipple B adapted for connection with a hose leading from a source of air pressure. The nipple B has extending therethrough a duct or passage $b$ which leads to a chamber $a$ in the housing, within which is located a valve C. The specific form of the casing, the valve chamber and valve therein, may be varied as desired, and as herein shown the valve is of the disk type and has an annular rib $c$ adapted to seat against and make a tight seal with a packing gasket, said valve being formed with a cylindrical projection $c'$ on its upper side which snugly fits and is guided within a cylindrical recess $a'$, and on its underside is formed with a deflator pin $c^2$ provided with flattened sides $c^3$ and a concave face $c^4$ at its free end. The casing A at its open face is formed with an enlarged socket $a^2$, the base of which serves as a seating face for a gasket and is provided with an annular rib $a^3$.

Disposed within the socket $a^2$ are a pair of packing gaskets D and E, the former providing a seat for the valve C and the latter providing means for insuring a leak-tight seal for the top of a tire valve stem or the like F, against which the air chuck is adapted to be pressed. The gaskets D and E are held within the casing A in such manner that the gasket E may be removed and replaced without disturbing the gasket D or unseating the valve C. Any means may be provided for accomplishing this, and I have herein shown several ways in which I propose to accomplish this.

In Figs. 1 to 4 the gasket D is held within the socket $a^2$ through the medium of a cylindrical, externally-threaded element G adapted to engage the threads within the socket $a^2$, said element having intermediate the ends of the screw-threaded portion an internal, radially-extending rib $g$, which, at its inner circumference, is integrally connected to a tubular bushing $g'$ intermediate the ends thereof. For firmly holding the gasket D in place within the socket and for insuring a leak-tight seal therewith, the element G is provided wth ribs $g^2$, one of which is in complemental relation to the rib $a^3$ on the base of the socket $a^2$. For facilitating the introduction and tightening of the element G within the socket it is provided with diametrically spaced openings $g^3$ for accommodating the pins of a spanner wrench. The gasket E is held within the socket against the rib $g$ through the medium of a chuck cap element H which has an externally screw-threaded portion $h$ adapted to engage within the screw-threaded socket $a^2$, and an internally-extending rib or flange $h'$ for engaging the face of the gasket. It is also provided with an annular rib $h^2$ in complemental relation to one of the ribs $g^2$ on the element G. The chuck cap H may be threaded into the socket member by hand, in which event the circumferential rib $h^3$ thereon will be milled, or, if desired, the outer face of the flange $h^2$ may be provided with a screw-driver slot or the like.

The bushing $g'$ is of a diameter to closely fit the inner peripheries of the gaskets D and E, and is designed to function both as a reinforcing means for said gaskets and as a guiding means for the valve deflator pin $c^2$, which has a snug sliding fit therein.

In Fig. 5 I have shown a modified form of gasket-retaining and spacing element G' which differs from that shown in Figs. 1 to 4 by being devoid of the central bushing element $g'$. This form of element may be employed either where it is not desired to reinforce the opening through the gaskets or with gaskets which are themselves provided with the necessary reinforcing means.

In Fig. 6 the element $G^2$ is formed at the inner periphery of its rib with a bushing $g^4$ which axially extends only downwardly with respect to said rib. This type of element may be used where reinforcing means are not deemed necessary for the upper gasket D or where such upper gasket may have other reinforcing means of its own.

In Fig. 7 I have shown a construction of gasket holding and spacing element $G^3$ of a form such that both gaskets D and E may be removed from the socket as a unit or only gasket E removed therefrom independently of gasket D. This I accomplish by forming the externally threaded wall $g^5$ of the element of a length to accommodate both gaskets D and E and form it with an integral manipulating flange $g^6$, by means of which the element as a unit may be inserted or removed from the socket. To permit the removal of the gasket E from the socket independently of the gasket D the inner face of the wall $g^5$ is internally screw-threaded, as indicated at $g^7$ and engaging within said socket is an externally-threaded bushing or washer J. To manipulate said washer J it may be provided with diametrically spaced spanner wrench receiving sockets $j$ or with a screw-driver slot, as is conventional.

In the operation of the air chuck shown in the various figures, the valve C is normally held upon the gasket D by the air pressure from the source acting upon the upper face of the valve. When the chuck is pressed against the top of a tire valve stem F or the like, the under face of the gasket E provides a leak-tight seal with said stem, and in the course of said application the deflator pin $c^2$ engages the top of the valve pin $f'$ to unseat the tire valve, and by reaction unseat the chuck valve C, thus permitting the ingress of air into the stem F. When, after extensive use, the gasket E becomes worn and no longer provides an efficient seal with the stem F, the chuck cap H can be readily removed, the gasket E withdrawn and replaced by another gasket, and the cap H replaced, all without affecting the gasket D or the seating of the valve C thereon. Such replacement can also be accomplished without cutting off the air supply or losing any of the compressed air. With the construction shown in Fig. 7, the gasket E, or both the baskets D and E, may be removed, as desired.

While I have shown and described certain preferred embodiments of my invention, I do not wish to be limited to the details of construction disclosed, since it will be apparent to one skilled in the art that said details of construction may be varied without departing from the spirit of the invention.

What I claim is:

1. An air chuck or the like comprising a casing having within it a valve provided with a deflator, a gasket providing a seat for said valve, a second gasket for making a seal with the end of a tubular member with which the air chuck is adapted for connection, said gaskets being mounted in superposed relation within said casing upon an element having a bushing-like portion extending into the opening in the second mentioned gasket and providing a guide for the deflator, and removable means engaging the sealing face of the second mentioned gasket whereby it may be removed from the casing independently of the first mentioned gasket.

2. An air chuck or the like comprising a casing having a socket, two superposed gaskets in said socket, means engageable with said socket for holding the gaskets therein, and secondary means engaging said first named means and one of the gaskets whereby the selective removal of one gasket or of both gaskets as a unit can be effected.

3. An air chuck or the like, comprising a casing having a screw-threaded socket, two superposed gaskets in said socket, and independent means screw-threadedly engaging in said socket for holding said gaskets therein, one of said means being a disk-like element having an annular recess in each of its faces for receiving said gaskets.

4. An air chuck or the like, comprising a casing having a screw-threaded socket, two superposed gaskets in said socket, and independent means screw-threadedly engaging in said socket for holding said gaskets therein, one of said means being a disk-like element having an annular recess in each of its faces for receiving said gaskets, said means permitting the removal of one of said gaskets without disturbing the other gasket.

5. As an article of manufacture, a cylindrical externally-threaded element having an internal radially-extending annular rib terminating in a tubular flange having a common axis with the cylindrical element and providing an internal annular recess.

6. As an article of manufacture, a cylindrical externally-threaded element having intermediate its ends an internal annular radially-extending rib integrally connected to a tubular bushing intermediate the ends thereof providing an internal annular recess on either face of the rib.

In witness whereof, I have hereunto signed my name.

SELDEN T. WILLIAMS.